US010083548B2

(12) United States Patent
Chiaverini

(10) Patent No.: US 10,083,548 B2
(45) Date of Patent: Sep. 25, 2018

(54) APPLIANCE DIAGNOSTIC INFORMATION VIA A WIRELESS COMMUNICATION LINK

(75) Inventor: Marc Jason Chiaverini, Mine Hill, NJ (US)

(73) Assignee: Cellco Partnership, Basking Ridge, NJ (US)

(*) Notice: Subject to any disclaimer, the term of this patent is extended or adjusted under 35 U.S.C. 154(b) by 833 days.

(21) Appl. No.: 13/606,678

(22) Filed: Sep. 7, 2012

(65) Prior Publication Data

US 2014/0074346 A1 Mar. 13, 2014

(51) Int. Cl.
*H04B 7/24* (2006.01)
*G07C 5/00* (2006.01)

(52) U.S. Cl.
CPC .................................... *G07C 5/008* (2013.01)

(58) Field of Classification Search
CPC ...................................................... G07C 5/008
USPC ...................................... 701/31, 31.5; 1/31.5
See application file for complete search history.

(56) References Cited

U.S. PATENT DOCUMENTS 6,058,307 A * 5/2000 Garner ............... H04B 7/18539 455/12.1
6,763,458 B1 * 7/2004 Watanabe ............... G06F 9/441 713/100
8,634,822 B2 * 1/2014 Silver ............... H04M 1/72577 340/439
8,996,212 B2 * 3/2015 Chen ......................... H02J 7/00 701/22
2002/0029101 A1 * 3/2002 Larson ................... G07C 5/008 701/32.6
2004/0217852 A1 * 11/2004 Kolls ...................... B60R 25/04 340/439
2005/0020120 A1 * 1/2005 Chen ...................... H01R 43/26 439/342
2005/0120112 A1 * 6/2005 Wing ..................... G06Q 10/06 709/224
2006/0136104 A1 * 6/2006 Brozovich .......... G06F 11/2294 701/31.4
2006/0208066 A1 * 9/2006 Finn ..................... G06K 7/0004 235/380
2007/0093943 A1 * 4/2007 Nelson ................ B60R 25/2018 701/2
2008/0140278 A1 * 6/2008 Breed ....................... G06F 8/65 701/31.4
2008/0186180 A1 * 8/2008 Butler ................ G06K 19/0723 340/572.1
2009/0088924 A1 * 4/2009 Coffee .................... B28C 5/422 701/31.4

(Continued)

*Primary Examiner* — Minh Truong
*Assistant Examiner* — Michael E Butler

(57) ABSTRACT

Wireless communication takes place between a first computing device and an appliance having a data center including diagnostic data. A subset of the diagnostic data may be communicated to a first server using a communications network and in turn information associated with the subset of the diagnostic data may be communicated to a second server. The second server then provides feedback to the first server that may be at least partially communicated to the first computing device. Wireless communication may also take place between a second computing device and the appliance, the second computing device selectively receiving a different subset of the diagnostic data. Subsets of different diagnostic data from different computing devices may result in a larger subset of the diagnostic data.

25 Claims, 2 Drawing Sheets

(56) References Cited

U.S. PATENT DOCUMENTS

2009/0089134 A1* 4/2009 Uyeki .................... G06Q 10/02 705/7.19
2009/0187360 A1* 7/2009 Lesesky ............... G01R 31/007 702/63
2009/0233572 A1* 9/2009 Basir .................... H04M 3/5116 455/404.1
2009/0299567 A1* 12/2009 Larschan ............... G06Q 10/06 701/29.2
2011/0025459 A1* 2/2011 Denison ................. G06Q 20/18 340/5.51
2011/0087370 A1* 4/2011 Denison ................ G07F 7/1025 700/236
2011/0131666 A1* 6/2011 Tanaka ................... G07C 5/085 726/30
2011/0205965 A1* 8/2011 Sprigg .................. G06F 9/4411 370/328
2011/0234427 A1* 9/2011 Ingram .................... G08G 1/20 340/995.1
2012/0053778 A1* 3/2012 Colvin ................... G07C 5/008 701/29.4
2012/0191242 A1* 7/2012 Outwater ............... G06Q 30/06 700/236
2013/0031318 A1* 1/2013 Chen ......................... H02J 7/00 711/154
2013/0091213 A1* 4/2013 Diab ...................... G06Q 50/01 709/204
2013/0144482 A1* 6/2013 Tuukkanen .............. G01V 8/12 701/29.6
2013/0176115 A1* 7/2013 Puleston ................. H04L 67/04 340/10.51
2013/0201316 A1* 8/2013 Binder .................... H04L 67/12 348/77
2013/0274953 A1* 10/2013 Miljkovic .............. G01C 21/00 701/1
2014/0089073 A1* 3/2014 Jacobs ................... G06Q 20/20 705/14.27
2014/0089078 A1* 3/2014 Dessert ............. G06Q 30/0238 705/14.38
2014/0134561 A1* 5/2014 Smith ..................... A61F 5/566 433/6
2014/0226010 A1* 8/2014 Molin .................... G06Q 10/06 348/148
2014/0304696 A1* 10/2014 Rantanen .................. G06F 8/65 717/169
2014/0306833 A1* 10/2014 Ricci ........................ B60Q 1/00 340/901
2015/0106289 A1* 4/2015 Basir ........................ G07C 5/00 705/325
2015/0130593 A1* 5/2015 Mats .................. G06K 7/10366 340/10.1

* cited by examiner

APPLIANCE DIAGNOSTIC INFORMATION VIA A WIRELESS COMMUNICATION LINK

BACKGROUND

Appliances include multiple electronic modules for controlling various appliance functions. Many electronic modules monitor themselves and their environments and are able to report diagnostic information using a diagnostic module having an interface with which a diagnostic device may communicate. For example, if the appliance is a vehicle such as an automobile or truck sold in the United States, the On Board Diagnostic (OBD) specification describes mandatory monitoring and diagnostic reporting requirements. A standardized (but specialized) OBD connector provides access to the reported diagnostics through a tool. The OBD connector can be accessed by only one physically-connected tool at a time.

The OBD connector in an appliance such as a vehicle may be less accessible than may be desirable. For example, it may be located under the dashboard towards the firewall. Additionally, the OBD connector and associated wiring may be expensive to manufacture and install.

It would be beneficial to provide appliances such as vehicles with a more easily accessed and less expensive interface for providing diagnostic information than the standardized OBD connector. It would further be beneficial for the interface to be accessible to multiple tools at or near the same time.

FIGURES

DETAILED DESCRIPTION

An appliance diagnostic system includes a wireless interface for communicating diagnostic information from the appliance to an external device. The appliance diagnostic system may further include an interface for transmitting the diagnostic information through a network to a data collection or distribution server. The diagnostic information may be transmitted from the data collection/distribution server to other servers, which in turn may provide responsive information back to the data collection/distribution server.

Figure 1:
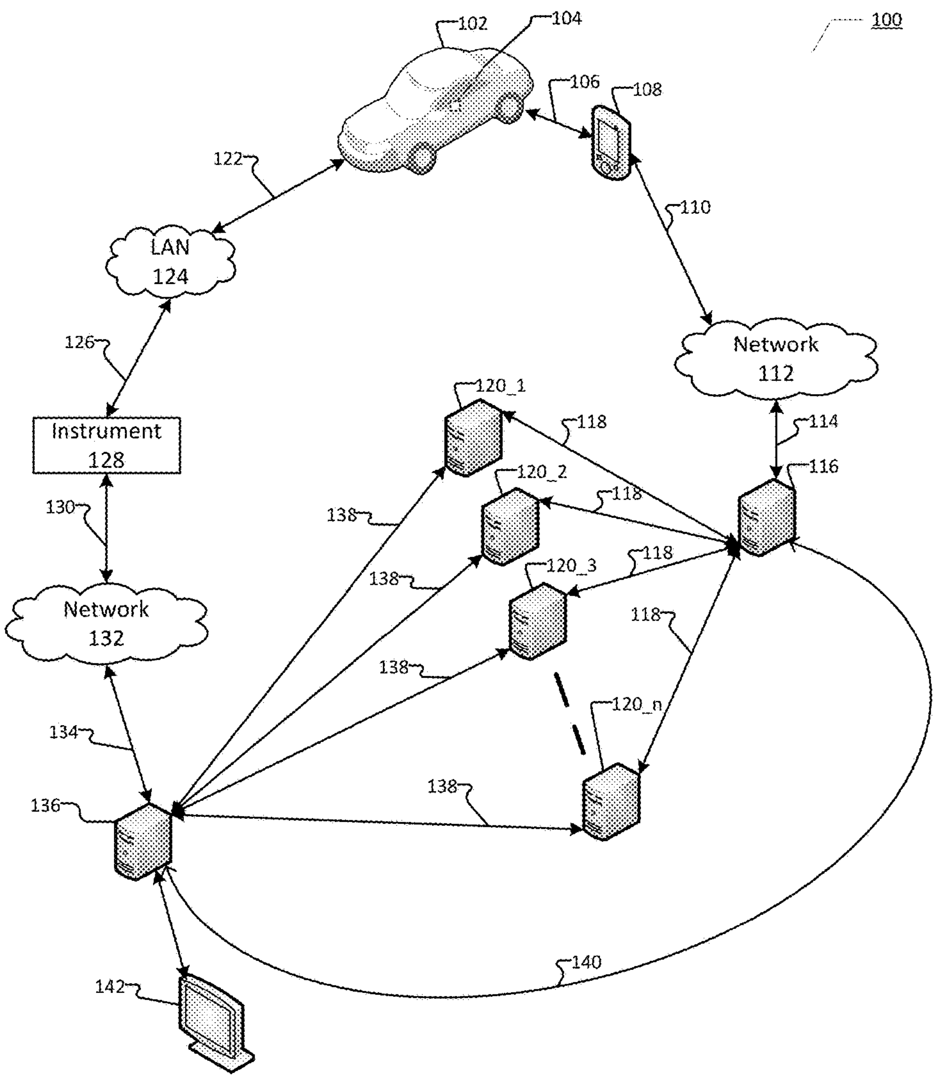
FIG. 1 illustrates an exemplary system for reporting vehicle diagnostic information through one or more networks.

Merely by way of example using a vehicle as an illustration of an appliance, vehicle diagnostic information includes such information as emissions, engine problems, vehicle damage, battery status, battery charge, fuel consumption, fuel level, mileage, transmission speed, engine speed, tire pressure, speed, temperature, oil pressure, air flow, pitch, yaw, roll, and acceleration. Many other vehicle diagnostics may be reported additionally or alternatively. Other examples of appliances include, but are not limited to refrigerators, washing machines or dryers, networking equipment, generators and HVAC equipment FIG. 1 illustrates an exemplary system 100 for reporting appliance diagnostic information through one or more networks. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used. Further, system 100 need not include all of the components illustrated.

More specifically, a system 100 for collecting diagnostic information by way of a wireless communication link for an appliance such as a vehicle 102 with a data control center 104 includes a device 108, an instrument 128, servers 116, 120, and 136, and user interface 142. Communication between components in system 100 in combination with appliance 102 and data center 104 include communication via connections 106, 114, 118, 122, 126, 130, 134, and 138, and through networks 110, 112 and 132.

An appliance 102 may have a form of a diagnostic interface in combination with one or more electronic control modules. In an exemplary approach, appliance 102 is a transportation device such as a vehicle including a car, truck, train, airplane, boat, or motorcycle, to name a few representative examples, which normally have an on-board diagnostic ("OBD") interface including connector. Electronic control modules (not shown) in appliance 102 gather diagnostic information about appliance 102 and its environment, and provide the diagnostic information to one or more diagnostic data centers 104 in appliance 102. The gathering of information may be performed periodically or may be event driven (e.g., in response to an external request, when a predetermined component threshold is detected as being reached). Diagnostic data center 104 organizes the data and communicates the data external to appliance 102 using one or more predefined wireless interfaces and predefined protocols. A data center 104 may be included within an electronic control module in appliance 102, or may alternatively be a separate unit within appliance 102.

Data center 104 transmits diagnostic information through a wireless interface to a receiving component being in the form of a computing device such as device 108 or instrument 128, instrument 128 being discussed in more detail below. In one exemplary implementation, data center 104 transmits information through a short-range wireless interface 106 to a receiving device 108. For example, data center 104 may transmit information through a Near Field Communication (NFC) protocol interface 106 to device 108. NFC includes a number of potential advantages including security, versatility, and ease of use. For example, NFC often creates a secure channel for communication and may use data encryption when sending data between data center 104 and device 108. The user of device 108 may be required to take an affirmative action to initiate or complete the information exchange. If these two devices have to be very close together to communicate, then it also means that an appliance owner or operator, as discussed in more detail below, must be in close proximity to both data center 104 and device 108. Also, it is unlikely that some unknown device can sneak into communication with the appliance from a long distance. Moreover, it is also possible to build many layers of security into a NFC enabled device. The communication may happen in real-time and is not hampered by a physical connection such as a cable. Moreover, NFC simply requires the two devices to be close to each other, which is often much simpler than the many user-initiated steps involved in setting up Bluetooth or other wireless connections between them.

In some situations data center 104 may even generate an NFC tag by way of a chip. In such a situation if device 108 has an NFC reading application, then triggering the application will send a signal to the NFC chip within data center 104, enabling electricity to flow through the circuit of the chip to generate a weak magnetic field. When device 108 is taken to an NFC tag the magnetic field will induce electricity in the NFC tag and the magnetic field generated by the NFC tag will be registered by device 108. In this case, device 108, which is using its power to generate a magnetic field is called an 'active NFC device' while the NFC tag which does not have its own power and in which the electricity is induced is called a 'passive NFC device'. A passive NFC device may also be used.

While device 108 may be a fixed device, a removable device, or a mobile device, in the context of the present discussion mobile device 108 may be a mobile device such as, for example, a "smart phone," a personal digital assistant (PDA), a tablet computer, or a notebook computer. If placed in a fixture such as a bracket even a mobile device may either be removable (e.g., snapped into a bracket for temporary placement) or fixed. Device 108 includes the capability to communicate with an access network 112 represented generally as a cloud using a connection 110. Network 112 may be one or more networks such as a local area network ("LAN"), wide area network ("WAN") or a core telecommunications network such as by way of example, a GSM (Global System for Mobile Communications), CDMA (Code-Division Multiple Access), LTE (Long Term Evolution), or other cellular network. Interfaces with access network 112 or between components of access network 112 include, but are not limited to any number of network interface devices, such as one or more of a router, access point, modem, optical network terminal, or the like. Other exemplary network components include home register networks (HLRs), authentication, authorization, and accounting (AAA) architecture, servers (e.g., front-end, back-end and database servers), base stations (e.g., radio base stations (RBSs), base transceiver stations (BTSs), and base station subsystems (BSSs)) within one or more circuits using teleprocessing heuristics The various networks represented using access network 112 are interconnected with and may communicate with each other in such a fashion that data transmitted or received by way of connection 110 between device 108 and network 112 is ultimately communicated to server 116 by way of connection 114, connection 110 and 114 being the same or different from one another in terms of their interface and communications protocols. For example, connection 110 may be wireless while connection 114 may be wired.

As noted above, server 116 includes the capability to communicate with network 112. Server 116 receives diagnostic information from appliance 102 through access network 110, access network 112 and connection 114 from device 108. Server 116 may store the received information, and may analyze or organize the data before distributing the data through connections 118 to one or more servers 120. In some exemplary approaches server 116 may be associated with a provider associated with at least one component of access network 112 and thus under control of a carrier such as a telecommunications provider. In other illustrative approaches access network 112 may only transmit data so that server 116 is hosted by a third party unrelated to a provider associated with access network 112.

Connections 118 may be wired or wireless direct connections. Alternatively, connections 118 may represent a combination of devices and wired or wireless connections through which information is transferred, such as a network.

In FIG. 1, four servers 120 are illustrated, servers 120_1, 120_2, 120_3, and **120_*n*, indicating that multiple servers 120 may receive the diagnostic information from appliance 102. Servers 120**, as discussed in more detail below, may be associated with different entities and located geographically remotely from each other.

In another exemplary implementation, data center 104 in appliance 102 transmits information through a wireless interface 122 to a local area network (LAN) 124. For example, data center 104 transmits information through a Wi-Fi interface 122 to LAN 124. LAN 124 may be located, for example, in a service facility (e.g., a garage in the case of appliance 102 being a vehicle). An instrument 128 in LAN 124 may receive the information from data center 104 via connection 126 to LAN 124. In other implementations the same approach may be used for connection 122 and 126 as for connection 106 for device 108 (e.g., using NFC). In some situations device 108 may also use a Wi-Fi interface.

Instrument 128 may organize the information and may further analyze the information. For example, instrument 128 may be a computing device, such as a general-purpose computer or a specialized test instrument from which a user may retrieve the information. For example, if instrument 128 is located in an authorized service facility associated with diagnostics and repair of appliance 102 it may directly store and include a processor for executing such protocols as diagnostic routines, repair suggestions, manuals associated with the specific model of appliance 102, parts lists and the like. In some exemplary approaches instrument 128 may include one or more client applications that interface with at least the data received by way of data center 104 and in some other implementations may control operation of data center 104 to help select the information needed to perform the desired task associated with appliance 102.

In one exemplary approach, by way of one or more client applications and associated information stored in at least one local database associated with instrument 128, the instrument may query data center 104 for diagnostic information. In turn it may use the information in combination with data stored locally in instrument 128 to determine a potential source of failure within the appliance 102. It may then make repair suggestions or even interface with one or more electronic modules within appliance 102 that are in turn interfaced with data center 104 to direct repairs by way of connections 126, 122 and LAN 124 (e.g., resetting an appliance component remotely). If parts are needed, instrument 128 may even identify those parts to a user of the instrument or a third party.

Instrument 128 may be in communication with a network 132 through connection 130, and may determine when to send the information gathered from data center 104 to other devices within system 100 or to query such devices for additional information and assistance that are then delivered. For example, if diagnostic protocols or appropriate model information are not available locally within instrument 128 that data may be transmitted to instrument 128 from an outside source. As another illustrative example, instrument 128 may send part information by way of connection 130 and network 132 to a remote location so that a replacement component may be located and delivered for use in appliance 102. Alternatively, other devices within system 100 associated with network 132 may directly query and request information from instrument 128 periodically, randomly, or in response to a predetermined event. For example, a device in network 132 may request diagnostic information about appliance 102 when it is estimated that appliance 102 has driven a certain number of miles and appliance 102 is connected with an instrument 128. A similar instrument may be located at more than one authorized garage and data polled from a more recent connection may be compared to data polled at an earlier time at a different location to help with diagnostic determinations.

Network 132 may be, for example, a telecommunications network such as a wide area network (WAN). Network 112 and network 132 may, but do not necessarily, share one or more components.

Figure 2:
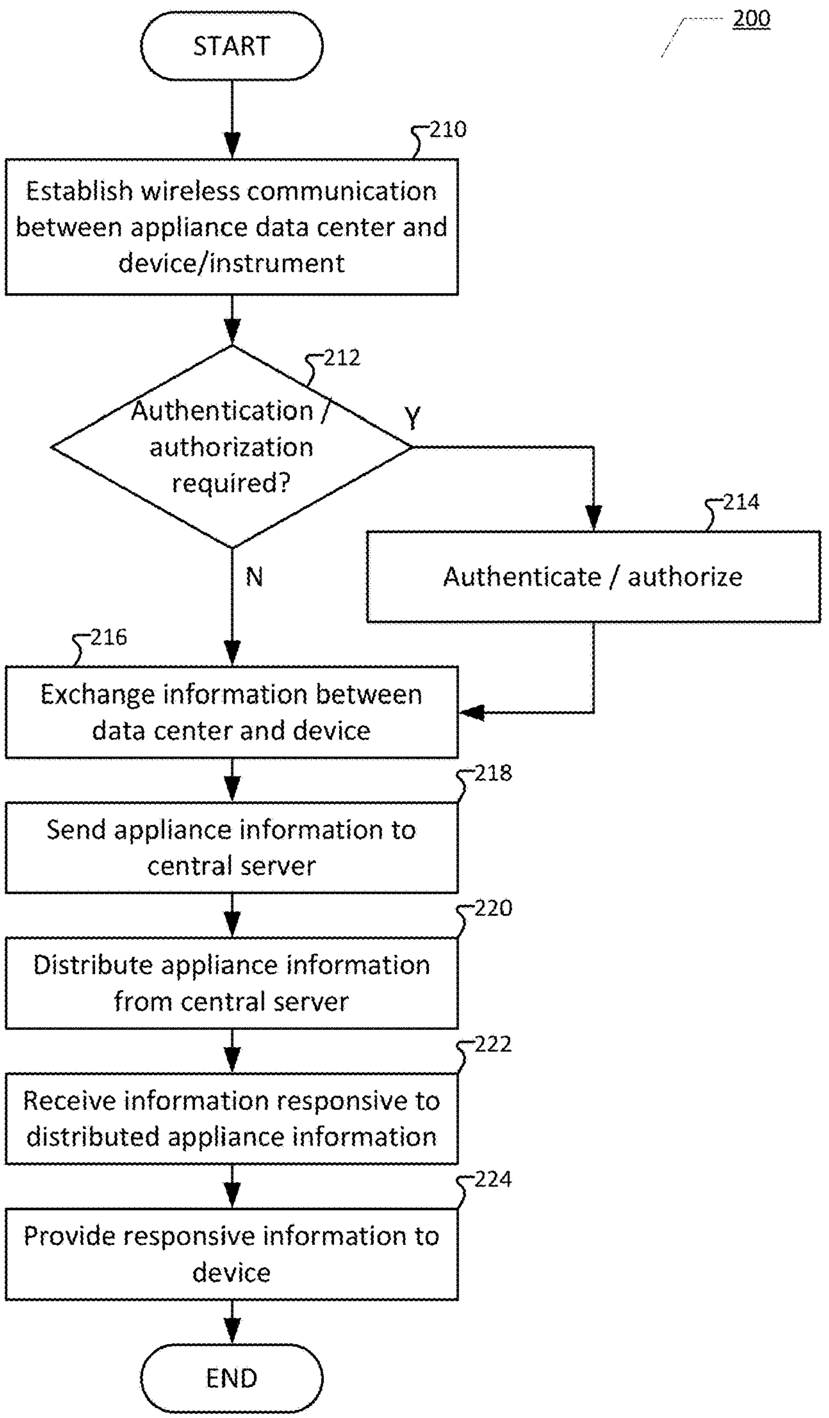
FIG. 2 illustrates an exemplary process for communication of appliance diagnostic information.

To facilitate the two-way communication of data and to facilitate implementation of any necessary interactions between instrument 128 and appliance 102, a server 136 is illustrated that includes the capability to communicate with network 132. Server 136 may receive or transmit information, data, or provide client applications to instrument 128 or appliance 102 by way of network 132 and connections 130 and 134 from device 128 and in turn between appliance 102 and instrument 128 using connections 122 and 126 in combination with LAN 124. Server 136 may store the received information, and may analyze or organize the data before distributing the data through connections 138 to one or more servers 120. Thus, it may act as a clearinghouse to help facilitate the determination of specialized assistance that may be appropriate from at least one server 120. Such servers 120 may be specialized for particular functions such as including a part ordering interface, databases of diagnostic or repair information that may be needed by instrument 128, client applications for use by instrument 128, databases of historical information that can be queried by server 136 in comparison to more up to date information, fleet management, insurance (e.g., repair after an accident), governmental control (e.g., taxing based on usage such as miles driven or emissions considerations) or the like. In other approaches a server 120 may receive data from server 136 and in turn query server 136 for additional information from appliance 102 using instrument 128 as noted above (e.g., a read out of information when certain mileage thresholds are met). While a variety of servers 120 are illustrated in some approaches a single server 136 may serve the function of one or more additional servers 120_1 to **120_*n* as illustrated in FIG. 2**.

Connections 126, 130, 134, and 138 may be wired or wireless connections. Connections 138 may be direct connections, which may be of particular importance if there are security considerations with server connection 134 in combination with server 136 and its communication interface with instrument 128 being firewalled. In other illustrations servers 120 may also be connected to network 132, but in the illustrated approach communications still take place with server 136, which in turn then communicates with one or more servers 120. Thus, server 136 continues to act as a clearinghouse.

In another exemplary implementation of system 100, data center 104 of appliance 102 is able to communicate with both device 108 and instrument 128 (using either the same or different connections and/or protocols), at different times or substantially concurrently in the sense that both device 108 and instrument 128 may simultaneously be in proximity with, but potentially communicating with data center 104 at different time intervals. If both device 108 and instrument 128 are communicating with data center 104 at the same time, such a communication is concurrent. In this implementation, a connection 140 may exist between servers 116 and 136. For example, it may be desirable for servers 116 and 136 to communicate with each other to build a more complete record of data associated with appliance 102. For example, instrument 128 may be associated with a repair center while device 108 may be controlled by an owner/operator of appliance 102, the device having data from data center 104 (e.g., at an earlier time) that is not available on a server 120. Privacy considerations as well as the capabilities of both instrument 128 and device 108 may be contributing factors in determining what data is transmitted to or from appliance 102 using either instrument 128 or device 108, contributing to dissimilar information being available between the two. Thus, a different subset of data may be received from data center 104 using each of device 108 and instrument 128, the combined subsets representing a greater subset of the total data available from the data center. In some approaches device 108 may act in many ways like instrument 128 and vice versa including the use of information and applications limited by the capabilities of each component or the authorizations provided to a user of each component (e.g., a qualified technician able to repair appliance 102 may need access to diagnostic routines that require specialized training an owner/operator lacks as compared to possible desire to limit access to information on appliance 102 to the technician unless needed, but which are of interest to the owner/operator of the appliance). Connection 140 may be a direct connection. Alternatively, connection 140 may represent a combination of devices and wired or wireless connections through which information is transferred, such as a network.

Any of the servers 116, 120, and 136 may be assets of one entity. Any of the servers 116, 120, and 136 may alternatively be a third-party server, in the sense that it is an asset of (or operated by) a different entity. The information communicated between the servers may be governed by contractual relationships. Some examples of third-party servers 120 include government servers, advertisement servers, fleet management servers, and insurance company servers. Such contractual relationships may depend on the issues associated with appliance 102 and the information to be transmitted (e.g., how fast an appliance 102 was travelling when an accident took place may be a factor in communicating with an insurance company server).

Component 142 represents a user interface for server 136. User interface 142 permits a user to access, review and perhaps modify appliance data and/or data associated with the appliance owner/operator. A user interface may also be associated with any of the other servers of FIG. 1 (not shown).

Having described the components of FIG. 1, a few examples will provide a better understanding of the capabilities of a system for appliance diagnostics through a wireless communication link, such as exemplary system 100.

In a first example of a system 100, an appliance includes an interface based on the Near Field Communication (NFC) protocol or other wireless communication protocol. For this example, NFC is used as the exemplary wireless communication protocol for ease of understanding. However, other wireless communication protocols may be used also or instead of NFC. The NFC interface is included in a data center 104 or in another electronic module that is in communication with a data center 104. Data center 104 gathers information from one or more electronic modules in the appliance. Information gathered by data center 104 is transmitted to one or more devices 108 using NFC. A common device 108 using NFC is a "smart phone," a device which includes cellular phone capability along with computing, audio, and video capabilities, among others. Another common device 108 which may include an NFC interface is a computing device such as tablet, netbook, or notebook computer. A device 108 receives the information from data center 104.

A graphical user interface (GUI) on device 108 provides the information received from data center 104 to the user in readable format and may permit the user to select and view specific data of interest, and set alarms for specific appliance conditions (e.g., a reminder to service vehicle based on mileage, or low wiper fluid). The GUI may be controlled by a client application within device 108. The GUI may also provide authentication or authorization services for access to the appliance information.

The GUI on device 108 may provide an option for the user to submit the data through network 112 to server 116. The GUI may further provide an option to select one or more servers 120 as intended recipients of information to be distributed by server 116. For example, if the information received from data center 104 is a driving profile for a period of time and/or service information, an intended recipient server 120 may be an insurance provider server that sets insurance rates based on driving history or a record of regular maintenance. In another example, if the information received from data center 104 is diagnostic information regarding an appliance issue, the intended recipient server 120 may be located in a service facility (e.g., when appliance 102 is a vehicle), which stores relevant service cost information of the service facility and can respond with an estimate of the cost to repair the issue. For another example, if the information from data center 104 is mileage information in a fleet vehicle such as one associated with business use by an employee of a company, the intended recipient server 120 may be a fleet management server, which monitors the fleet to schedule routine maintenance. Such a fleet management server or the like may in turn have a mechanism to promote the sending of information such as mileage information using some form of electronic notification to an operator/owner or other interested party. Electronic notification includes, for example, electronic mail, real-time texts, or instant messaging. The notifications may be appended to a log that can be accessed when desired by an intended recipient. In another example, if the information received from data center 104 is emissions information, the intended recipient server 120 may be a Department of Motor Vehicles (DMV) server, which monitors emissions of the vehicle and instructs the driver to go to a service center for an emissions test. In yet another illustrative example, based on the results of diagnostics from appliance 102 undertaken by device 108 an advertising server 120 may be queried to suggest one or more repair facilities in the geographic region of appliance 102 most likely able to address the perceived issue with the appliance and present the facilities to an owner/operator of appliance 102 by way of device 108. These server 120 examples are provided merely by way of example and are not limiting.

Device 108 may automatically submit information to server 116, and server 116 makes a decision on distribution of the information to servers 120. For example, using the last example above, server 116 may receive information from device 108, determine that appliance 102 has an issue and requires attention, provide information related to the issue to an advertising server 120, receive location information from the advertising server 120 related to local gas stations or vehicle service garages, and provide the location information to device 108 for presentation through a GUI.

For privacy purposes, server 116 may not contain sensitive personal information associated with the vehicle or owner/operator. In other embodiments, server 116 may contain personal information, but may limit the transmission of such information dependent on the server with which it is to provide the vehicle information from data center 104. Thus, server 116 may provide information from data center 104 in a raw (e.g., as received by the server) or processed (e.g., modified in some form such as to remove personal information) form to a secure server acting as a gatekeeper to protect against potential intrusions for distribution to one or more servers 120.

In a further example of a system 100, an appliance 102 includes an interface based on the Wi-Fi standard protocol or other wireless protocol. Thus, more than one wireless interface may be used by appliance 102 at the same time (e.g., NFC and Wi-Fi). Wi-Fi is used in this example for ease of understanding, but is not limiting. An instrument 128 such as a diagnostic instrument or other computing device communicates with data center 104 using Wi-Fi. A GUI on device 128 provides the information received from data center 104 to the user of device 128 in readable format. The GUI may also provide authentication or authorization services for access to the vehicle information (as well as permitting other user interaction with the data), as described above, for example. A Wi-Fi LAN may provide a secure environment; thus, authentication may not be necessary.

The GUI on device 128 may provide an option for the user to submit the data through network 132 to server 134. The GUI may further provide an option to select one or more servers 120 as intended recipients of information to be distributed by server 136, as similarly described above with respect to the first example of system 100. Thus, different portions of the data may be individually transmitted to different servers 120 dependent on each server's data requirements. The data may contain different ID codes associated with information stored in the particular server to which the data portion is being sent. Each ID code may permit the particular server to match the data portion with personal data (e.g., VIN, policy number, personal identification of the vehicle owner) without the personal data being stored or transmitted outside of the control of the entity operating the server.

Device 128 may automatically submit information to server 136. In turn, server 136 may make a decision on distribution of the information to servers 120. For example, the providing of data may be associated with a threshold value associated with the data (e.g., a mileage or time threshold must be met before the data is transmitted to a governmental server), a condition (e.g., an accident requiring the involvement of an insurance company), a diagnostic issue (e.g., the need for specialized information from a specific database server), or a part to be replaced based on the results of an analysis of appliance 102, among other considerations.

For privacy purposes, server 136 may not include sensitive personal information associated with the vehicle or user, and may provide information from data center 104 in a raw or processed form to a secure server for distribution to servers 120.

In some implementations, device 108 and instrument 128 may communicate with each other. In other implementations, device 108 and instrument 128 are combined in one physical structure, such as in a computing device.

In one exemplary approach noted above the various communications between appliance 102 and both device 108 and instrument 128 are wireless. Thus, it may not be necessary to have a wired connection to a physical interface on an appliance such as by way of an onboard diagnostic port using a physical connector. By avoiding such a physical connection flexibility may be provided in terms of permitting an instrument 128 or device 108 to be used in communication with an appliance 102 that would not be possible if a physical connection were required. Moreover, as a practical matter only one physical port may be used at a time. By bypassing such a port it may be possible for an instrument

128 and a device 108 to communicate with device 102 concurrently or substantially concurrently. If appliance 102 is a vehicle such an approach can be particularly advantageous by permitting a first computing to be within the vehicle itself and another computing device to be in a second vehicle in close proximity with the first vehicle, but collecting diagnostic information from the first vehicle by way of the second wireless communication.

FIG. 2 illustrates an exemplary process 200 used in a system 100. Process 200 begins at block 210 with establishment of communication between a vehicle data center 104 and a device 108 or instrument 128. For example, if the interface is an NFC interface, the device 108 or instrument 128 is brought in close proximity to data center 104 and handshaking according to the NFC protocol is performed with both devices having the necessary hardware, software and/or firmware to promote usage of the NFC protocol and the resulting handshaking. The arrangement on one side may be different than the arrangement on the mating side so long as the NFC protocol may be used in the illustrative approach. If the interface is a Wi-Fi interface, in one example, instrument 128 is brought within the boundary of the Wi-Fi LAN. The LAN may be in a development facility, a service garage, or at home, for some examples. A LAN is generally geographically large enough to allow for instrument 128 to be at a distance from appliance 102. Data center 104 may communicate with device 108 or instrument 128 while appliance 102 is stationary or while appliance 102 is moving. Several moving vehicles 102 could be part of a LAN, and could receive information from each other.

Even if wireless communication may be established there may be additional considerations. For example, in some approaches a threshold must be met before any further steps are undertaken (e.g., a passage of a predetermined time since the last successful communication) or the requirement for a proactive request for communication must be made. In the illustrated flow, however, it is assumed that communication commences automatically once a connection is established.

At decision block 212, process 200 determines whether authentication and/or authorization may be required for communication with data center 104. If yes, authentication and/or authorization is performed at block 214. One form of authentication may be via a password or personal identification number (PIN) entered into device 108 or instrument 128, and upon receipt of the correct authentication information the exchange of information with data center 104 may commence. Another form of authentication may be through sending authentication information to server 116, and having server 116 authenticate the user of device 108 and return authorization to device 108 for accessing the appliance information. In other exemplary illustrations a client application running on device 108 or instrument 128 results in the device or instrument merely acting as a conduit for data related to appliance 102 that is not able to be viewed on the device although it may be desirable to at least acknowledge when a data transfer has taken place. Once it leaves block 214 process 200 continues at block 216. On the other hand, if no authentication/or authorization is required at decision block 212, block 214 is bypassed and process 200 continues at block 216.

At block 216, information is exchanged between data center 104 and device 108 or instrument 128. Information exchange may be one-way or two-way. For example, in a one-way exchange, data center 104 provides the available information or a subset thereof to device 108 or instrument 128 without being queried specifically. In a two-way exchange, device 108 or instrument 128 may request specific information that data center 104 then provides.

At block 218, during or in response to completing the exchange of information at least a subset of appliance information received from data center 104 may be provided to either or both server 116 or 136.

At block 220, information received at server 116 or 136 is distributed to one or more servers 120. The distributed information may be raw data as received by server 116 or 136 and then processed by the intended server(s) 120. Alternatively, server 116 or 136 may process the information and send only relevant information or queries to the intended server(s) 120 based on a condition being met such as one of those illustrated above.

At block 222, server 116 or 136 receives information back from the server(s) 120 to which the information was distributed. For example, if a part that appliance 102 requires is available, both the availability of the part and its cost/timing of delivery may be retrieved. As another example, if manual or diagnostic information or a client application is needed it may be received from an applicable server 120.

At block 224, server 116 or 136 provides information received from server(s) 120 to device 108 or instrument 128, respectively. The timing for providing the information may depend on a number of conditions. For example, server 136 may wait to share a client application with instrument 128 until it is determined that a pre-existing application will not fix a fault within appliance 102. As another example, a parts list may not be required by instrument 128 if there are no physical components requiring service or replacement. Following block 224, process 200 ends.

It should be understood that, although process 200 has been described as occurring according to a certain ordered sequence, process 200 could be practiced with the described steps performed in an order other than the order described herein. It further should be understood that certain steps could be performed simultaneously, that other steps could be added, or that certain steps described herein could be omitted. In other words, the description of process 200 is provided for the purpose of illustrating one implementation, and should in no way be construed so as to limit the claimed invention.

As illustrated, process 200 uses a variety of different hardware components that are linked together and mechanisms to promote the communication of information. For example, hardware components may include servers 116, 120 and 136. Additional hardware components include device 108 and instrument 128 that in turn communicate with a hardware component in the form appliance 102. Process 200 may be provided as hardware, software or firmware, or combinations of software, hardware and/or firmware. For example, data center 104 may require hardware in the form of a processor and tangible memory to facilitate the storage and dissemination of data. It may also have hardware to facilitate wireless communication with respect to device 108 or instrument 128 as discussed above (e.g., a transceiver connected to an antenna by way of a physical cable). However, for the communication to take place, it may include firmware that does not have to be reprogrammed or otherwise modified on a regular basis that promotes handshaking and the ability to communicate data with the mating instrument or device. The same considerations apply equally to device 108 and instrument 128 as well as the other hardware components. Although one example of the modularization of process 200 is illustrated and described, it should be understood that the operations thereof may be provided by fewer, greater, or differently named modules.

In general, computing systems and/or devices, such as data center 104, device 108, instrument 128, and servers 116, 120, and 136, may contain one or more processors and memories and employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, handheld computer, smart phone, personal digital assistant (PDA), or some other known computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor receives instructions from a memory, a computer-readable medium, or the like, and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

It is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:

receiving, by a device, input indicating that the device is in a position to establish communication with a diagnostic data center, located within an appliance, via a near field communication tag, the near field communication tag being located within the appliance, and the diagnostic data center having diagnostic data associated with operation of the appliance;

establishing, by the device and based on receiving the input, a wireless communication between the device and the diagnostic data center via the near field communication tag;

sending, by the device and based on establishing the wireless communication, authentication information to a first server;

receiving, by the device, authorization information based on the device being authenticated, by the first server, to communicate with the diagnostic data center;

receiving, by the device and based on receiving the authorization information, a set of diagnostic data from the diagnostic data center;

communicating, by the device, at least a subset of the first set of diagnostic data to the first server by way of a communications network, computing device information associated with the subset of the set of diagnostic data being distributed from the first server to a second server; and receiving, by the device, feedback from the second server based on the computing device information, the feedback including a particular application based on a determination that a pre-existing application will not fix a fault within the appliance.

2. The method of claim 1, where establishing the wireless communication between the device and the diagnostic data center via the near field communication tag comprises:

establishing a two-way wireless communication between the device and the diagnostic data center via the near field communication tag.

3. The method of claim 1, wherein establishing the wireless communication between the device and the diagnostic data center via the near field communication tag comprises:

establishing the wireless communication between the device and the diagnostic data center via the near field communication tag based on a magnetic field being induced in the device by the near field communication tag.

4. The method of claim 1, further comprising:

performing a near field communication handshake; and wherein establishing the wireless communication between the device and the diagnostic data center via the near field communication tag comprises:

establishing the wireless communication between the device and the diagnostic data center via the near field communication tag based on performing the near field communication handshake.

5. The method of claim 1, where the set of diagnostic data is a first set of diagnostic data;

where the computing device information is first computing device information;

where the wireless communication is a first wireless communication;

where the feedback is first feedback; and where the method further comprises:

establishing a second wireless communication between a computing device and the appliance based on the computing device being within a predetermined geographic range of the appliance;

receiving a second set of diagnostic data from the appliance by way of the second wireless communication;

communicating at least a subset of the second set of diagnostic data from the computing device;

distributing second computing device information associated with the subset of the second set of diagnostic data;

receiving second feedback in response to the second computing device information; and providing the second feedback to the computing device.

6. The method of claim 5, wherein at least one of:

the subset of the first set of diagnostic data is different from the subset of the second set of diagnostic data, or the first computing device information is different from the second computing device information.

7. The method of claim 5, wherein the second feedback received in response to the second computing device information is from the second server.

8. The method of claim 7, wherein communicating at least the subset of the second set of diagnostic data comprises:

communicating at least the subset of the second set of diagnostic data from the computing device to another server, different from the first server, the first server and the other server being connected; and wherein the method further comprises:

combining the subset of the first set of diagnostic data and the subset of the second set of diagnostic data to comprise a third subset of diagnostic data from the diagnostic data center of the appliance.

9. The method of claim 5, wherein communicating at least the subset of the second set of diagnostic data from the computing device comprises:

communicating at least the subset of the second set of diagnostic data from the computing device to the first server.

10. The method of claim 5, wherein the subset of the first set of diagnostic data and the subset of the second set of diagnostic data are combined to comprise a third subset of total diagnostic data from the diagnostic data center of the appliance.

11. The method of claim 5, wherein the second wireless communication comprises Wi-Fi.

12. The method of claim 5, further comprising:

conducting the first wireless communication and the second wireless communication concurrently.

13. The method of claim 1, where the computing device information is first computing device information; and where the method further comprises:

receiving additional feedback from a third server in response to diagnostic information from the appliance, the third server having second computing device information, the second computing device information being different from the first computing device information based on a dissimilar distribution from the first server to the third server.

14. The method of claim 13, wherein the third server is at least one of:

a government server, an advertisement server, a fleet management server, or an insurance company server.

15. The method of claim 1, wherein the appliance is a vehicle and the set of diagnostic data includes information regarding at least one of:

battery status, battery charge, fuel consumption, fuel level, mileage, transmission speed, engine speed, tire pressure, speed, temperature, oil pressure, air flow, pitch, yaw, roll, or acceleration.

16. A device comprising:

a memory storing instructions; and a processor to execute the instructions to:

receive input indicating that the device is in a position to establish communication with a diagnostic data center, located within an appliance, via a near field communication tag, the near field communication tag being located within the appliance, and the diagnostic data center having diagnostic data associated with operation of the appliance;

establish, based on receiving the input, a wireless communication between the device and the diagnostic data center via the near field communication tag;

send, based on establishing the wireless communication, authentication information to a first server;

receive authorization information based on the device being authenticated, by the first server, to communicate with the diagnostic data center;

receive, based on receiving the authorization information, a set of diagnostic data from the diagnostic data center;

communicate at least a subset of the set of diagnostic data to the first server by way of a communications network, computing device information associated with the subset of the set of diagnostic data being distributed from the first server to a second server; and receive feedback from the second server based on the computing device information, the feedback including a particular application based on a determination that a pre-existing application will not fix a fault within the appliance.

17. The device of claim 16, wherein, when establishing the wireless communication between the device and the diagnostic data center via the near field communication tag, the processor is to:

establish a two-way wireless communication between the device and the diagnostic data center via the near field communication tag.

18. The device of claim 16, wherein, when establishing the wireless communication between the device and the diagnostic data center via the near field communication tag, the processor is to:

establish the wireless communication between the device and the diagnostic data center via the near field communication tag based on a magnetic field being induced in the device by the near field communication tag.

19. The device of claim 16, wherein, when establishing the wireless communication between the device and the diagnostic data center via the near field communication tag, the processor is to:

establish the wireless communication between the device and the diagnostic data center via the near field communication tag based on performing a near field communication handshake.

20. The device of claim 16, wherein the wireless communication is a first wireless communication;

wherein the set of diagnostic data is a first set of diagnostic data;

wherein the computing device information is a first computing device information;

wherein the feedback is first feedback; and wherein the processor is further to:

establish a second wireless communication between a computing device and the appliance based on the computing device being within a predetermined geographic range of the appliance;

receive a second set of diagnostic data from the appliance by way of the second wireless communication;

communicate at least a subset of the second set of diagnostic data from the computing device;

distribute second computing device information associated with the subset of the second set of diagnostic data;

receive second feedback in response to the second computing device information; and provide the second feedback to the computing device.

21. A non-transitory computer-readable medium including instructions, the instructions comprising:

one or more instructions that, when executed by one or more processors of a device, cause the one or more processors to:

receive input indicating that the device is in a position to establish communication with a diagnostic data center, located within an appliance, via a near field communication tag, the near field communication tag being located within the appliance, and the diagnostic data center having diagnostic data associated with operation of the appliance;

establish, based on receiving the input, a wireless communication between the device and the diagnostic data center via the near field communication tag;

send, based on establishing the wireless communication, authentication information to a first server;

receive authorization information based on the device being authenticated, by the first server, to communicate with the diagnostic data center;

receive, based on receiving the authorization information, a set of diagnostic data from the diagnostic data center;

communicate at least a subset of the set of diagnostic data to the first server by way of a communications network, computing device information associated with the subset of the set of diagnostic data being distributed from the first server to a second server; and receive feedback from the second server based on the computing device information, the feedback including a particular application based on a determination that a pre-existing application will not fix a fault within the appliance.

22. The non-transitory computer-readable medium of claim 21, wherein the one or more instructions, when executed that cause the one or more processors to establish the wireless communication between the device and the diagnostic data center via the near field communication tag, cause the one or more processors to:

establish a two-way wireless communication between the device and the diagnostic data center via the near field communication tag.

23. The non-transitory computer-readable medium of claim 21, wherein the one or more instructions, when establishing the wireless communication between the device and the diagnostic data center via the near field communication tag, cause the one or more processors to:

establish the wireless communication between the device and the diagnostic data center via the near field communication tag based on a magnetic field being induced in the device by the near field communication tag.

24. The non-transitory computer-readable medium of claim 21, wherein the one or more instructions, when establishing the wireless communication between the device and the diagnostic data center via the near field communication tag, cause the one or more processors to:

establish the wireless communication between the device and the diagnostic data center via the near field communication tag based on performing a near field communication handshake.

25. The non-transitory computer-readable medium of claim 21, wherein the wireless communication is a first wireless communication;

wherein the set of diagnostic data is a first set of diagnostic data;

wherein the computing device information is a first computing device information;

wherein the feedback is first feedback; and wherein the one or more instructions, when executed by the one or more processors, further cause the one or more processors to:

establish a second wireless communication between a computing device and the appliance based on the computing device being within a second predetermined geographic range of the appliance;

receive a second set of diagnostic data from the appliance by way of the second wireless communication;

communicate at least a subset of the second set of diagnostic data from the computing device;

distribute second computing device information associated with the subset of the second set of diagnostic data;

receive second feedback in response to the second computing device information; and provide the second feedback to the computing device.

* * * * *